United States Patent [19]

Emmons et al.

[11] Patent Number: 5,308,656
[45] Date of Patent: May 3, 1994

[54] ELECTROFORMED MASK AND USE THEREFORE

[75] Inventors: David J. Emmons, Richfield; Douglass H. Atwill, II, Eden Prairie, both of Minn.

[73] Assignee: ADC Telecommunications, Inc., Minneapolis, Minn.

[21] Appl. No.: 730,734

[22] Filed: Jul. 16, 1991

[51] Int. Cl.$^5$ .............................................. B05D 1/32
[52] U.S. Cl. .................................. 427/282; 427/163; 427/300; 205/70; 156/644
[58] Field of Search .................. 205/70; 427/163, 282, 427/169, 300; 156/644

[56] References Cited

U.S. PATENT DOCUMENTS

| | | | |
|---|---|---|---|
| 1,708,084 | 4/1929 | Doane | 205/70 |
| 3,286,690 | 11/1966 | McGlasson et al. | |
| 4,067,937 | 1/1978 | Unno et al. | 427/169 |
| 4,326,771 | 4/1982 | Henry et al. | 156/644 |
| 4,469,719 | 9/1984 | Martin | 427/255.5 |
| 5,037,176 | 8/1991 | Roberts et al. | 385/16 |
| 5,063,178 | 11/1991 | Toomey | 427/2 |
| 5,100,507 | 3/1992 | Cholewa | 427/163 |
| 5,125,946 | 6/1992 | Bhagavatula | 427/167 |
| 5,132,057 | 7/1992 | Tomisaka et al. | 427/163 |
| 5,135,590 | 8/1992 | Basavanhally et al. | 156/662 |

OTHER PUBLICATIONS

Patent Abtracts of Japan, vol. 9, No. 289 (P-405)(2012) Nov. 15, 1985 & JP,A,60 128 407 (Hitachi).
Patent Abstracts of Japan, vol. 13, No. 165 (P-860)(3513) Apr. 20, 1989 & JP,A,64 002 007 (Nec Corp.).
Patent Abstracts of Japan, vol. 7, No. 167 (C-177)(1312) Jul. 22, 1983 & JP,A,58 073 767 (Hitachi).

Primary Examiner—Shrive Beck
Assistant Examiner—Diana Dudash
Attorney, Agent, or Firm—Merchant, Gould, Smith, Edell, Welter & Schmidt

[57] ABSTRACT

A method of applying a coating to a fiber end retained in the holder is disclosed. A master is formed having an external geometry substantially identical to the geometry of the holder. A mask is formed by applying a thin coating of a mask material onto the master with a hole formed through the material at a location corresponding to a location of a fiber end on the holder. The master is removed from the mask. The mask is placed on the holder with the hole exposing the fiber end. The coating is applied through the hole and onto the fiber end and the mask is removed from the holder.

8 Claims, 5 Drawing Sheets

ELECTROFORMED MASK AND USE THEREFORE

I. BACKGROUND OF THE INVENTION

1. Field of the Invention

This invention pertains to an electroformed mask. More particularly, this invention pertains to such a mask for use in providing a coating to an end of an optical fiber.

2. Description of the Prior Art

Commonly assigned and copending U.S. patent application Ser. No. 07/467,748 filed Jan. 19, 1990, teaches an optical switch having a plurality of optical fibers bundled in an array and centrally positioned within a ferrule. A switch includes two such ferrule/fiber array assemblies. The assemblies are positioned with their end faces opposing one another and with one assembly rotatable relative to the other. As shown in the aforementioned patent application, in a preferred embodiment, the arrays of one surface are provided with a concave depression. The opposing array is provided with a convex protrusion. The purpose of the cooperating concave/convex design is, in part, to reduce or eliminate back reflection.

In using optical fibers in the telecommunications industry, it is well known to provide the fiber ends with an anti-reflective coating. Such coatings are typically minute layers of a glass dielectric. A common thickness for an anti-reflective coating may be about 1 micron deposited on the end of a fiber.

When depositing an anti-reflective coating on the end of a fiber array such as that shown in the aforementioned U.S. patent application Ser. No. 07/467,748, it is desirable not to deposit a coating on the ferrule surface which will abut against a ferrule surface of an opposing ferrule/fiber array assembly. If an anti-reflective coating were to be placed on abutting surfaces, the coating would be ground off during operation of the switch. This would create debris which could reduce the optical effectiveness of the switch. It is an object of the present invention to provide a mask for use in applying a coating on a fiber array.

II. SUMMARY OF THE INVENTION

According to a preferred embodiment of the present invention, a method is provided for applying a coating to a fiber end retained in a holder such as a ferrule. The holder has a predetermined external geometry, and the fiber end is exposed at a predetermined location on the external geometry. The method includes the steps of forming a master having an external geometry substantially identical to the predetermined external geometry. A mask is formed on the master with the mask in the form of a thin coating deposited on said master. A hole is formed through the coating at a location corresponding to the predetermined location. The mask is removed from the master, and the mask is placed on the holder with the mask hole exposing the fiber end. A coating is applied to the fiber end through the mask hole. The mask is then removed from the holder.

III. BRIEF DESCRIPTION OF THE DRAWINGS

IV. DESCRIPTION OF THE PREFERRED EMBODIMENT

Referring now to the several drawing figures in which identical elements are numbered identically throughout, a description of the preferred embodiment of the present invention will now be provided.

Figure 1:
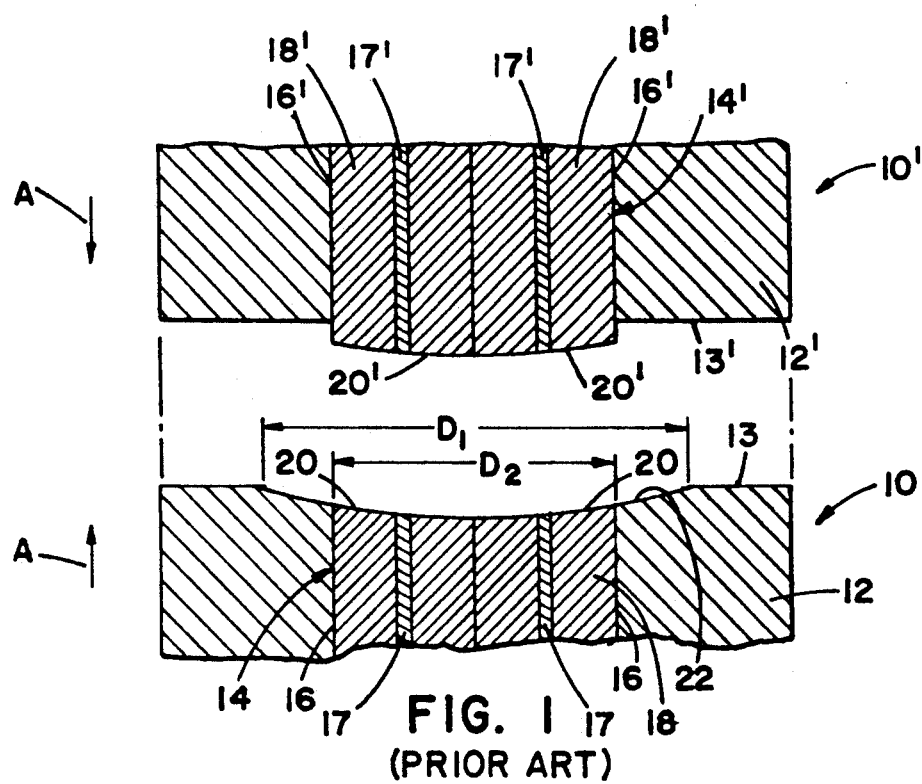
FIG. 1 is a cross-sectional view of two assemblies of fiber arrays and ferrules opposing one another.
Figure 10:
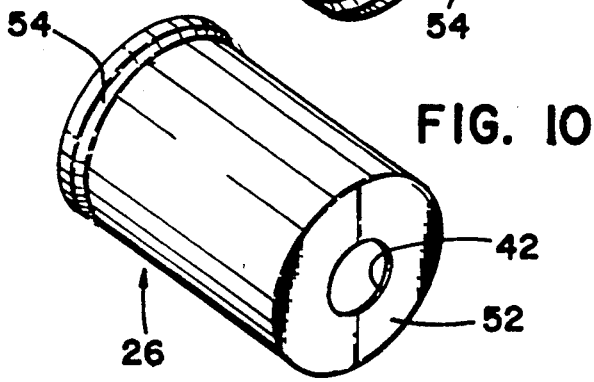
FIG. 10 is a front and side perspective view of the mask of FIG. 9.
Figure 11:
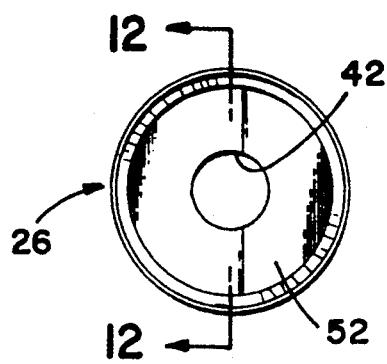
FIG. 11 is a front and elevation view of the mask of FIG. 9.
Figure 12:
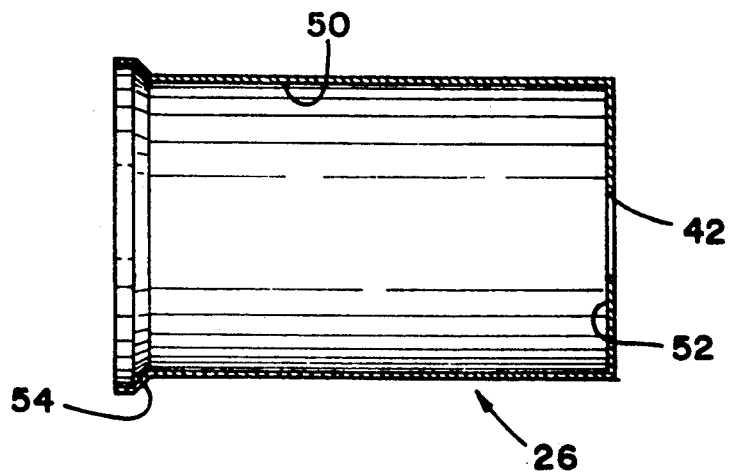
FIG. 12 is a cross-sectional view taken along line 12—12 of FIG. 11 of FIG. 9.

FIG. 1 shows opposing fiber array/ferrule assemblies such as those shown in FIG. 10 of the aforementioned U.S. patent application Ser. No. 07/467,748 filed Jan. 19, 1990. The ferrule assemblies include a first assembly 10 and a second opposing assembly 10'. Assembly 10 includes a ferrule body 12 (or fiber holder) having a flat end face 13. Centrally disposed within body 12 is a fiber array 14, which includes fibers 16. Each of fibers 16 has a fiber core 17 surrounded by a fiber cladding 18. The fiber array 14 terminates at an array end face which is the surface area of the end faces 20 of each of the fibers.

Assembly 10' is similar to assembly 10. Assembly 10' includes a ferrule 12' having an end face 13'. The ferrule 10' holds array 14' consisting of fibers 16', each having a core 17' surrounded by a cladding 18'. The array 14' terminates at an array end face which is the area of the fiber end faces 20'.

As shown in FIG. 1, fiber assembly 10 includes a concave depression 22. Depression 22 is formed in both the ferrule 12 and the fiber 14. In contrast, assembly 10' does not include a depression. Instead, fiber array 14' presents a convex end face 20' which protrudes past a flat ferrule end face 13'. As a result of this structure, end face 13 is a flat annular ring surrounding depression 22. Accordingly, when the fiber arrays 10,10' are urged together in the direction of arrows A, annular surface 13 abuts and rotates against flat surface 13', with the surface 13 acting as bearing surface.

It is known to be desirable to apply an anti-reflective coating to the end faces 20,20'. In doing so, it is desirable not to apply the anti-reflective coating to the bearing surface 13 or any portion of surface 13' which might abut surface 13. If an anti-reflective coating were to be applied to such surfaces, the coating would flake or grind off during rotary action of the switch. This would result in debris penetrating the gap between surfaces 20,20'. Such debris would reduce the optical effectiveness of the resulting switch. As a result, we have determined it is desirable to apply an anti-reflective coating on surface 20 as well as a portion of surface 22. Also, it is desirable to apply an anti-reflective coating on surface 20' and that portion of surface 13' which opposes only depression 22. For purposes of understanding the teachings of the present invention, relative dimensions are provided in FIG. 1. Specifically, the dimension $D_1$ is the diameter of the depressed area 22. Dimension $D_2$ is the diameter of the array 14. It will be appreciated that array 14' has the same diameter as array 14.

To apply an anti-reflective coating to surfaces 19,19', we have determined it is desirable to provide a mask 26 which can be used to cover the ferrule assemblies 10,10' to expose the surfaces 20,20' for application of anti-reflective coating. We have determined that it is desirable to provide such a mask 26 having a hole 42 sized greater than diameter $D_2$ but smaller than diameter $D_1$. As a result, anti-reflective coating gets deposited covering surfaces 20,20' as well as a portion of surface 22 and a portion of surface 13' which would oppose only surface 22. The enlarged surface area of the anti-reflective coating (i.e., a surface area greater than the areas 19,19') is to avoid shadowing which would result from having a mask 26 with a hole 42 having a diameter precisely equal to $D_2$.

In making a mask 26 to apply an anti-reflective coating to fiber assemblies 10,10', it is desirable to provide a mask 26 which is cheap to manufacture yet accurately sized to provide for accurate placement of the anti-reflective coating. The fabrication of such a mask and its use in applying an anti-reflective coating is the subject of the remaining drawing figures.

Figure 2:
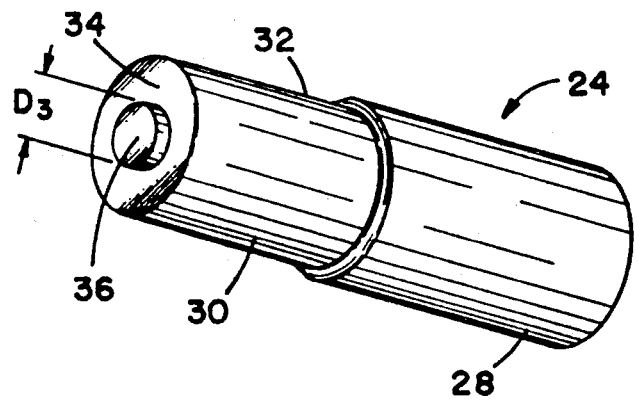
FIG. 2 is a perspective view of a master for forming a mask according to the present invention.
Figure 3:
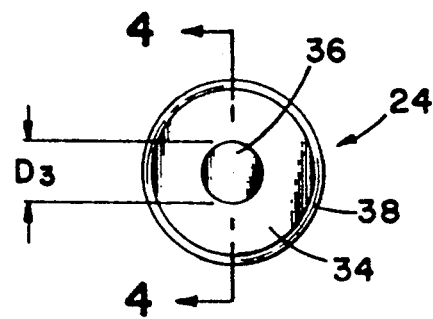
FIG. 3 is an end elevation view of the master of FIG. 2.
Figure 4:
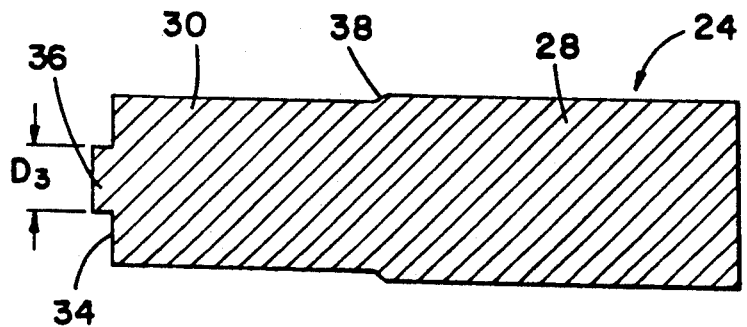
FIG. 4 is a view taken along lines 4—4 of FIG. 3.

Referring now to FIGS. 2-4, a master 24 is shown for use in making a mask 26 (shown in FIGS. 9-12). Master 24 is preferably formed of a material which can be easily removed or etched away, as will be described. In a preferred embodiment, master 24 is formed of aluminum.

The master 24 includes a base section 28 and a mask forming section 30. The mask forming section is generally cylindrical and has a cylindrical surface 32 terminating at a flat axial face 34. Centrally disposed on flat axial face 34 is a cylindrical hub 36 having a diameter $D_1$ equal to a desired diameter of an anti-reflective coating to be applied to the ferrule assemblies 10,10'. In a preferred embodiment, diameter $D_3$ is greater than diameter $D_2$ but smaller than diameter $D_1$. The geometry of surfaces 32,34 are selected to be complementary to the known or predetermined geometry of ferrules 12,12'. Furthermore, the hub 36 is positioned to be in a location corresponding to the known location of the fiber ends 20,20' on bodies 12,12'.

As shown best in FIG. 4, base section 28 is of a larger diameter than mask forming section 30. A chamfer 38 is provided joining section 30 to section 28.

Figure 5:
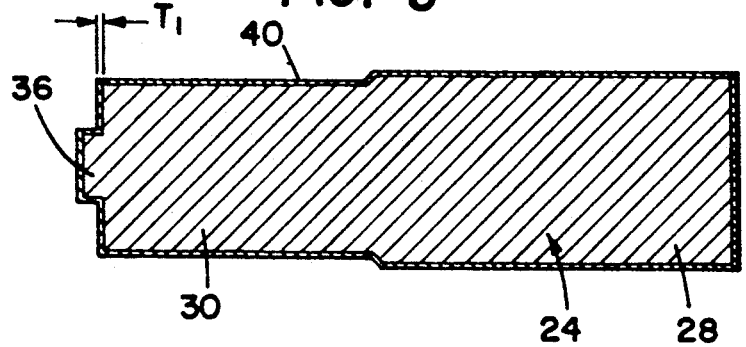
FIG. 5 is a the view of FIG. 4 showing a mask coating applied to the master of FIG. 4.

With master 24 formed as described, a thin coating 40 of a mask material is deposited on master 24 to completely surround master 24. As shown in FIG. 5, the coating 40 is very thin and preferably has a thickness $T_1$ of about 50 microns. In a preferred embodiment, the coating 40 is a material which will not be chemically removed during the etching removal of the aluminum of master 24. In a preferred embodiment, the material of coating 40 is nickel, which is electrolytically deposited on master 24.

Figure 6:
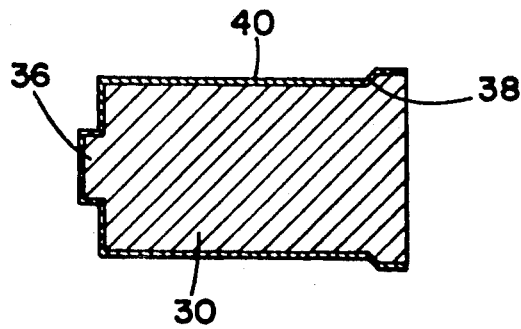
FIG. 6 is the view of FIG. 5 with the base of the master trimmed away.
Figure 7:
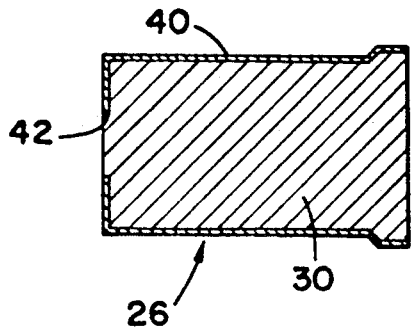
FIG. 7 is the view of FIG. 6 showing formation of a hole in the mask.

After applying coating 40 to master 24, the base end 28 is severed and discarded to leave the mask forming section 30 covered by coating 40 as shown in FIG. 6. Next, the hub 36 is ground or polished as shown in FIG. 7 to remove the hub 36. As a consequence, a hole 42 is formed in the coating 40. With the formation of hole 42, coating 40 is now a mask 26 which is covering the solid aluminum of mask forming section 30.

Figure 8:
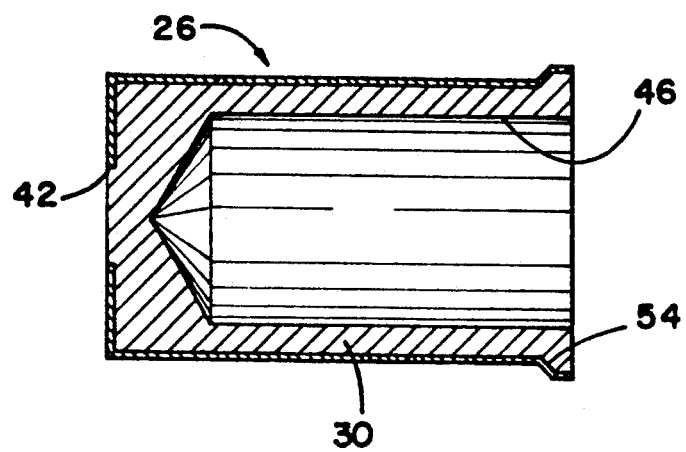
FIG. 8 is the view of FIG. 6 showing partial removal of the material of the master side and rear perspective.
Figure 9:
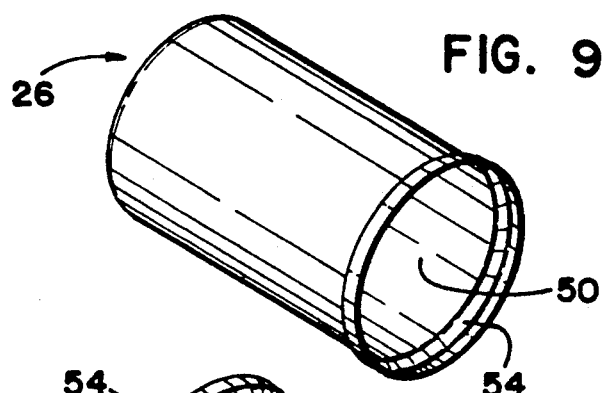
FIG. 9 is a side and rear perspective view of a mask made according to the present invention.

With the mask 26 thus formed, it is desirable to remove the material of mask forming section 30. The material can be removed in any desirable manner. In the preferred embodiment, the material is first grossly removed by drilling out as much of the material as possible without damaging mask 26. FIG. 8 shows a bore 46 formed by drilling out the material of mask forming section 30. With as much of the material removed as possible, as shown in FIG. 8, the remaining material of mask forming section 30 is removed by etching the material off of mask 26. In the preferred embodiment, this will be accomplished by immersing the mask 26 and mask forming section 30 in a bath of sodium hydroxide. This will etch away the aluminum of Section 30 but not the nickel of mask 26. As a result of this etching process, a completed mask 26 is formed as shown in FIGS. 9-12. The completed mask 26 has a cylindrical inner surface 50 and an axial end face 52 which has a geometry that is accurately complementary to the geometry of ferrules 10,10'. Hole 42 is disposed at a location accurately corresponding with the location of end faces 19,19'. An axial end 54 of mask 26 is enlarged to permit a ferrule 10,10' to be easily inserted within the mask 26 and slid to a position with surfaces 13,13' abutting axial end 52.

Figure 13:
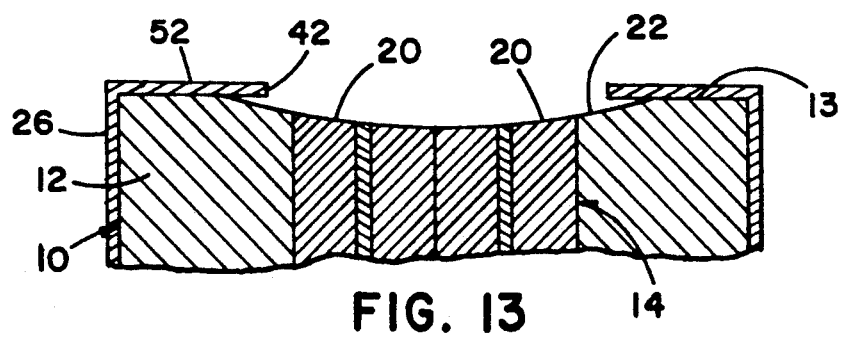
FIG. 13 is a cross-sectional view showing the mask of FIG. 9 applied to one of the ferrule/fiber array assemblies of FIG. 1.
Figure 14:
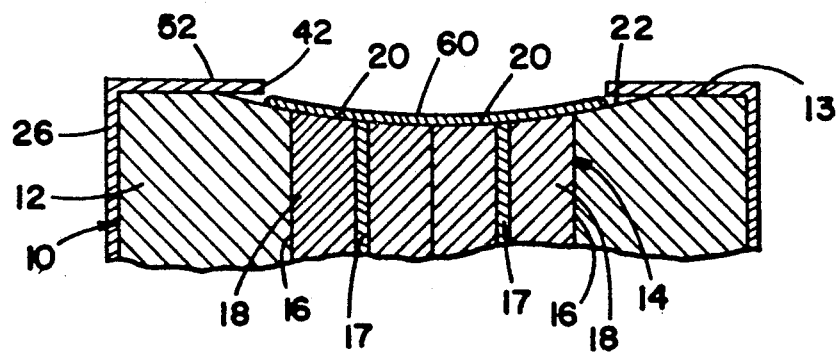
FIG. 14 is the view of FIG. 13 showing an anti-reflective coating applied to the fiber array of FIG. 13.
Figure 15:
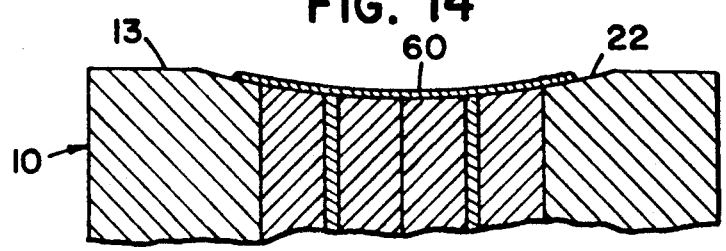
FIG. 15 is the view of FIG. 14 showing the mask removed and the completed ferrule/fiber array assembly.

FIG. 13 shows a mask 26 placed on ferrule assembly 10. As shown, axial end 52 completely the covers annular flat surface 13 and exposes all of fiber ends 20 and a substantial portion of depressed surface 22. With the mask in position as shown in FIG. 13, an anti-reflective coating may be deposited through any desirable means known in the art. The applied anti-reflective coating 60 is shown in FIG. 14. As shown in FIG. 14, the anti-reflective surface 60 is provided with a uniform thickness completely covering surfaces 20. To prevent shadowing, a portion of the anti-reflective coating 60 is permitted to extend beyond surfaces 20 onto surface 22. However, the mask 26 completely prevents anti-reflective coating 60 from being applied to flat annular surface 13. FIG. 15 shows the completed assembly 10 after removal of the mask 26.

In the foregoing description, the mask 26 has been used to apply coating to assembly 10. In a similar manner, the mask 26 could be used to apply coating to assembly 10'. The mask hole 42 would permit a portion of the anti-reflective coating to be applied to surface 13. However, the size of the hole 42 would prevent anti-reflective coating from covering a sufficiently large area of surface 13' which would abut surface 13.

From the foregoing detailed description of the present invention, it has been shown how the objects of the invention have been achieved in a preferred manner. A mask 26 is formed through an inexpensive electrolytic process. The mask 26 is very accurately fitted to the assemblies 10,10'. The mask 26 permits depositing of a uniform thickness anti-reflective coating 60 on the fiber ends 20,20'. It is anticipated that the mask 26 could be used about ten times or so (i.e., to apply coating to ten assemblies 10,10,), after which time the anti-reflective coating material will build up on the mask 26, requiring either cleaning of the mask 26 or forming a new mask 26.

Figure 16:
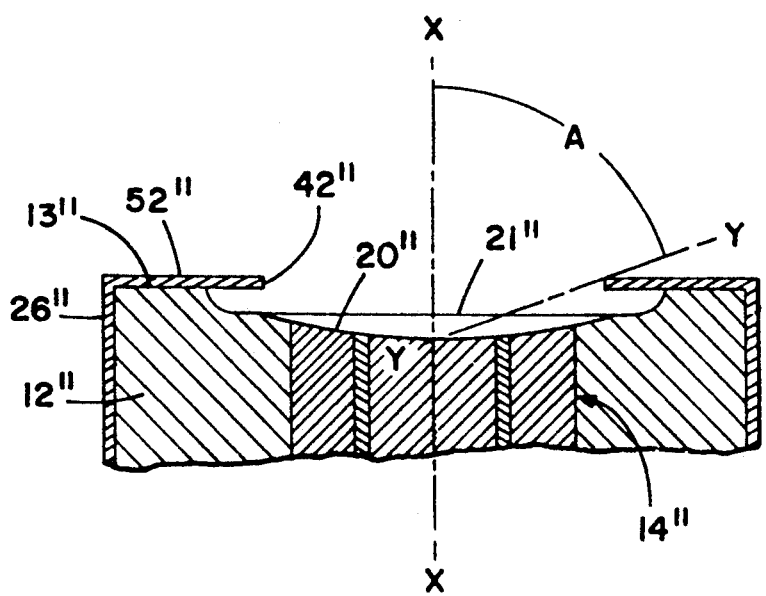
FIG. 16 is a view similar to that of FIG. 13 showing an enhanced method of applying a coating.

FIG. 16 shows an enhanced or a preferred method of applying a anti-reflective coating to the concave end face 20". As shown in the embodiment of FIG. 16, the ferrule 12" contains the fiber array 14" similar to that shown in FIG. 13. The fiber array 14" terminates at a concave end surface 20". The ferrule 12" has a flat axial bearing surface 13". A recession 21" is formed on a face 13" such that surface 20" is recessed from bearing surface 13". The mask 26" includes an axial end face 52" with a hole 42". As shown, surface 20", 21" and hole 42" are concentric around the axis X—X of the ferrule 12". Depression 21" has a diameter greater than that of hole 42". The diameter of surface 20" is smaller than the diameters of either surface 21" or hole 42".

The structure shown in FIG. 16 is provided to improve the application of the anti-reflective coating to the surface 20". As shown, the mask hole 42" is smaller in diameter than that of the recessed polished surface 21". As a result, the end face 22" of mask 26" covers the bearing surface 13" to prevent anti-reflective coating being placed on the surface 13". The opening 42" is an aperture through which the anti-reflective coating may be applied to surface 20".

In applying an anti-reflective coating, it is known that the coating process is sensitive to the angle A defined as the acute or lesser included angle between the axis X—X and a line Y—Y extending from the center of surface 20" to the edge of hole 42". As the size of the angle A increases, the coating process becomes less sensitive to variations and manufacturing tolerances (such as part location, fixtures and geometry). Therefore, it is desirable to increase the angle A. If surface 20" were the only recess polish in the holder 12", the mask opening 42' would not be large enough to provide for a sufficient coating process. The large diameter recess 21" is provided at a shallower depth than that of recess 20". The larger diameter recess 21" reduces the bearing surface 13" which allows the mask opening 42" to be increased in size and improves the fiber coating acceptance angle A.

It having been shown how the objects have been achieved in the preferred manner, those skilled in the art may consider modifications or equivalents of the disclosed concepts. It is intended that the scope of the present invention not be limited to the specific preferred embodiment, but shall include such modifications and equivalents as will readily occur to one skilled in the art.

What is claimed is:

1. A method of applying a fiber coating to a fiber end retained in a holder where said holder has a holder external geometry and where said fiber end is exposed at a location on said holder external geometry; said method comprising the steps of:

forming a master mold having a master external geometry substantially identical to said holder external geometry, said master mold being formed of a master material removable through a chemical process;

forming a mask on said master mold, with the mask in the form of a mask coating of a mask material having a hole formed in said mask material at said location, said hole formed of a mask material not removable by said chemical process;

removing said master mold from said mask by applying said chemical process to said master mold and said mask to remove the said master material while leaving said mask material;

placing said mask on said holder, with said hole exposing said fiber end;

applying said fiber coating through said hole and onto said fiber end; and removing said mask from said holder.

2. The method according to claim 1, wherein said fiber end has a diameter, the method including forming said hole to have an area greater than said diameter.

3. The method according to claim 1, wherein said holder has a bearing surface surrounding said fiber end with said fiber end exposed through said bearing surface, the method including sizing said hole for said fiber end to be exposed through said hole and without said bearing surface being exposed through said hole.

4. A method according to claim 1 wherein said fiber coating is an anti-reflective coating.

5. The method according to claim 1 wherein said step of removing said master mold from said mask includes the step of chemically etching said master material away from said mask material.

6. A method according to claim 1 wherein said mask coating is applied to said master mold through electrolytic depositing.

7. A method of applying a fiber coating to a fiber end retained in a holder where said holder has a holder external geometry and where said fiber end is exposed at a location on said holder external geometry; said method comprising the steps of:

forming a mask on said master mold, with the mask in the form of a mask coating of a mask material having a hole formed in said mask material at said location, said hole formed by providing said master mold with a protrusion at said location, said hole formed by removing said protrusion after applying said mask coating;

removing said master mold from said mask;

placing said mask on said holder, with said hold exposing said fiber end;

applying said fiber coating through said hole and onto said fiber end; and removing said mask from said holder.

8. A method according to claim 7 further comprising sizing and protrusion to have an area substantially equal to an area of said hole.

* * * * *

UNITED STATES PATENT AND TRADEMARK OFFICE
CERTIFICATE OF CORRECTION

PATENT NO. : 5,308,656
DATED : May 3, 1994
INVENTOR(S) : David J. Emmons, et al

It is certified that error appears in the above-identified patent and that said Letters Patent is hereby corrected as shown below:

Column 6, between line 42 and 43 insert --forming a master mold having a master external geometry substantially identical to said holder external geometry-- after the word "of:".

Column 6, line 57, "sizing and protrusion" should read --sizing said protrusion --, and "substantially" should read --approximately--.

Signed and Sealed this

Twenty-fifth Day of October, 1994

Attest:

BRUCE LEHMAN

Attesting Officer

Commissioner of Patents and Trademarks